US009190940B2

(12) United States Patent
Markham

(10) Patent No.: US 9,190,940 B2
(45) Date of Patent: Nov. 17, 2015

(54) BRUSHLESS MOTOR SPEED CONTROL SYSTEM

(75) Inventor: Richard Markham, Winfrith Newburgh (GB)

(73) Assignee: Bosch Security Systems BV, Eindhoven (NL)

( * ) Notice: Subject to any disclaimer, the term of this patent is extended or adjusted under 35 U.S.C. 154(b) by 808 days.

(21) Appl. No.: 13/508,367

(22) PCT Filed: Nov. 6, 2009

(86) PCT No.: PCT/CA2009/001617
§ 371 (c)(1),
(2), (4) Date: Feb. 19, 2013

(87) PCT Pub. No.: WO2011/054074
PCT Pub. Date: May 12, 2011

(65) Prior Publication Data
US 2013/0169196 A1 Jul. 4, 2013

(51) Int. Cl.
*H02P 7/00* (2006.01)
*H02P 6/08* (2006.01)
*H02P 6/18* (2006.01)
*H02P 25/02* (2006.01)
*H02P 27/04* (2006.01)

(52) U.S. Cl.
CPC .. *H02P 7/00* (2013.01); *H02P 6/08* (2013.01); *H02P 6/181* (2013.01); *H02P 25/026* (2013.01); *H02P 2209/07* (2013.01)

(58) Field of Classification Search
USPC .............................. 318/3, 599, 400.17, 400.09
See application file for complete search history.

(56) References Cited

U.S. PATENT DOCUMENTS

| 4,544,868 | A | 10/1985 | Murty |
| 4,926,104 | A | 5/1990 | King et al. |
| 5,270,632 | A | 12/1993 | Hirota et al. |
| 5,793,180 | A * | 8/1998 | Maiocchi et al. ............. 318/718 |
| 6,091,216 | A | 7/2000 | Takahashi et al. |
| 6,541,939 | B2 | 4/2003 | Kishibe et al. |
| 6,777,897 | B2 * | 8/2004 | Murai ........................ 318/400.2 |
| 6,975,082 | B2 * | 12/2005 | Crain et al. .............. 318/400.09 |
| 7,102,306 | B2 | 9/2006 | Hamaoka et al. |
| 2004/0263681 | A1 * | 12/2004 | Teramoto et al. ............. 348/375 |
| 2005/0046371 | A1 * | 3/2005 | Degen et al. .................. 318/439 |

(Continued)

OTHER PUBLICATIONS

International Search Report and Written Opinion for Application No. PCT/CA2009/001617 dated Jul. 12, 2010 (9 pages).

*Primary Examiner* — Paul Ip
*Assistant Examiner* — Said Bouziane
(74) *Attorney, Agent, or Firm* — Michael Best & Friedrich LLP

(57) ABSTRACT

This system provides a wide range of smooth and precisely controlled low and high speeds for pan-tilt-zoom surveillance cameras, in which a brushless motor is controlled by a Microcontroller in a low speed mode by sinusoidal synchronous commutation, in a high speed mode by block commutation, and in a transition phase from the low speed mode to the high speed mode by modulating integrated pulse-width modulation (PWM) square waves with sine waves. PID and lookup table registers are used by a microcontroller for a smooth transition from high speed mode to low speed mode, and from low speed mode to high speed mode, phase locking a sine position during transitions, in order to give a surveillance camera an ability to quickly move from one target to another at up to 100 degrees per second yet track objects that are moving very slowly.

30 Claims, 9 Drawing Sheets

(56) References Cited

U.S. PATENT DOCUMENTS

| | | |
|---|---|---|
| 2006/0039807 A1 | 2/2006 | Hamaoka et al. |
| 2006/0110140 A1 | 5/2006 | Harada |
| 2006/0158142 A1* | 7/2006 | Kurosawa et al. ............ 318/254 |
| 2007/0030355 A1* | 2/2007 | Nishikawa ............... 348/207.99 |
| 2007/0050917 A1* | 3/2007 | Kim et al. ........................ 8/158 |
| 2008/0092893 A1* | 4/2008 | Boyle et al. ............... 128/204.21 |
| 2009/0218971 A1* | 9/2009 | Jeung ....................... 318/400.17 |
| 2009/0236012 A1* | 9/2009 | Gass et al. .................... 144/427 |
| 2011/0234132 A1* | 9/2011 | Norell ...................... 318/400.14 |
| 2011/0266992 A1* | 11/2011 | Nishiguchi et al. ........... 318/807 |
| 2012/0206078 A1* | 8/2012 | Norell et al. ............. 318/400.42 |

\* cited by examiner

BRUSHLESS MOTOR SPEED CONTROL SYSTEM

FIELD OF INVENTION

This invention relates to a novel device in the general field of motor control systems, and more specifically to one which permits a wider range of speeds for brushless motors as used in pan-tilt-zoom surveillance cameras.

BACKGROUND OF THE INVENTION

Surveillance cameras are commonly directed to move at high speed so they can identify and track a potential intruder as early as possible. However, it has been found that very slow moving threats are not always detected by some surveillance cameras because they are not capable of operating at very slow tracking speeds, and because slow speed operation presents unique technological challenges to produce recognizable images. Motorized panning and tilting of surveillance cameras at a wide range of speeds require motors that can operate smoothly at both high and low speeds. While high speed operation can effectively use brushless motors in block commutation modes, low speed operation using the same mode can degrade the quality of the image due to the lower frequency of the stepping function. This is especially apparent when a camera is panned or zoomed to follow a target that has a large down range movement as opposed to a large movement across the horizon. Fine movements of a slow-moving camera that are not smoothed out can cause noticeable stuttering and vibration that create blurring or misinterpretation of surveillance images. There is a need for a surveillance camera motion control system that operates smoothly at both high and low speeds, and does not require expensive digital encoding methods to enable smooth and precise motor control timing at low speeds. Some attempts to solve this problem have been found in the prior art and will now be described.

One prior art attempt to solve this problem is a controller used for a variable speed fridge compressor (U.S. Pat. No. 7,102,306). While both high speed block commutation and low speed sine commutation are used to provide a wider speed range, the smoothness of low speed operation is not sufficient to operate long range surveillance cameras. Another prior art attempt to solve this problem is a controller used for a variable speed dentist drill (U.S. Pat. No. 6,091,216). Again, both modes are used to provide both speed ranges, but the speed variation at slow speed ranges is not sufficient to prevent blurred images for long range surveillance camera control applications. In summary, there is still a need for a Brushless Motor Speed Control System which provides a sufficiently smooth operation for consistently clear long range surveillance imaging when used at low speeds, but is also capable of high speed camera movement when needed, and which combines these elements efficiently, at low cost, and with fewer extraneous components.

BRIEF SUMMARY OF THE INVENTION

The Brushless Motor Speed Control System is designed to provide smooth and precisely controlled low and high speed motor driving, of a very wide speed range, employing the same controller. The issue with brushless motors employing hall sensors for high speed block commutation timing is that the hall sensors do not provide enough resolution to drive the motor consistently at low speeds. One solution is to run the motor synchronously at speeds below approximately 200 rpm. If this is done using the same block commutation timing, the resulting rotation is very notchy as the motor jumps from one magnet position to the next. By implementing a sinusoidal synchronous commutation at low speeds, this notchiness is removed.

The disclosed speed control system was designed because the camera surveillance industry is switching from older style brush motors to brushless motors. Most new surveillance cameras use BRUSHLESS motors to pan, tilt, and zoom (PTZ) and these motors operate by the block commutation method using pulse-width modulation (PWM) motor control circuitry. At high speeds, this method operates smoothly, but at low speeds, they cannot create an image without noticeable blurring caused by the lowered positional discrimination in this mode. Smooth low speed operation of brushless motors is possible by operating as a stepper motor with sinusoidal synchronous commutation, but the seamless integration of these two complimentary commutation modes is not available using presently available methods and technologies.

A key aspect of this invention is the control of brushless motor speeds using the functional integration of two commonly employed commutation methods. Smooth low speed control is achieved without the need for expensive digital encoders, by synchronously driving three PWMs, sine wave modulated. Smooth high speed control employs trapezoidal Hall Effect feedback looping with programmable controller PID (Proportional, Integrated, Differential) error correction. Long range surveillance cameras require PTZ motors able to operate at any speed without image blurring due to unneeded motions caused by limitations of commutation modes or transition between modes. Therefore a means to ensure smooth transition between low and high speed commutation mode is also necessary and is incorporated in this control system.

With the introduction of advanced programmable controllers employing greater peripheral functionality and including integrated PWM drivers, much smoother operation of dual mode brushless motor controllers is now possible. New software capabilities with greater sampling rates not only permit smoother operation in both commutation modes, but also smoother transition between modes. In this design, no expensive digital encoders are required at low speeds, yet fine motor resolution is possible, enabling clear images even at rotation rates of one per month or less. At the same time, a high speed mode, with nominal speeds of up to 100 degrees per second, is available without the speed limitations and overheating of the stepper motor mode. The resulting control system requires fewer complex and expensive parts, a simpler implementation, and provides an exceptionally wide speed range suitable for long range surveillance imaging of consistent clarity.

The invention thus is essentially a brushless motor control system for providing a wide range of smooth and precisely controlled low and high speeds for pan-tilt-zoom surveillance cameras, in which a brushless motor is controlled by a programmable controller:
  a) in a low speed mode by sinusoidal synchronous commutation;
  b) in a high speed mode by block commutation;
  c) in a transition phase from the low speed mode to the high speed mode by modulating integrated pulse-width modulation (PWM) square waves with sine waves.

The system achieves smooth low speed control without the need for digital encoders, by the programmable controller synchronously driving multiple PWMs, sine wave modulated, in the low speed mode.

Examples of the "programmable controller" would be i) a microcontroller, running software fed to it, ii) a field programmable gate array (FPGA), configured to control the motor's circuits, or iii) an application specific integrated circuit (ASIC), dedicated to controlling the motor's circuits.

In one preferred embodiment:
a) appropriate high speed control is achieved by a motor driver card that receives Hall sensor outputs from the brushless motor and provides appropriate PWM output to drive the brushless motor at a selected speed;
b) the high speed mode employs trapezoidal Hall Effect feedback looping with programmable controller Proportional, Integrated, Differential (PID) error correction;
c) a camera control card issues Video System Control Architecture formatted commands on a TTL serial bus to a Pan motor driver card or to a Tilt motor driver cards or to a camera;
d) motor driver cards can command a motor to go to a specific position, report the current position by means of a digital resolver, drive at a specific speed and direction, and stop;
e) motor driver cards can command a motor to send back data, such as current motor speed and PWM levels and can set motor operational parameters;
f) the operation parameters include one or more of closed loop gains, acceleration rates, and brake force;
g) an auxiliary control card can allow for three independent integrated circuit bus protocol ports so that pan, tilt and zoom positions can be fed to it from each position, thereby enabling external dedicated secure control pathways for panning, tilting and zooming;
h) a motor driver card used to regulate the speed of pan/tilt/zoom (PTZ) motors as directed from an external source such as a camera control card or an auxiliary control card;
i) the brushless motor comprises a series of stationary wire-wound stators affixed around a central rotating multipolar magnet rotor that generates rotary motion to move a surveillance camera around each axis when provided with an appropriately timed PWM output through the stators;
j) Hall Sensors are positioned around the brushless motor to detect polarity changes as it rotates, and to provide speed regulation feedback signals to a programmable controller by means of a sensor output pathway;
k) the programmable controller generates control signals for a PWM driver chip which supplies PWM output for the brushless motor;
l) a resolver driver chip detects and processes motor positions for each axis and forwards angular positional data to a programmable controller chip;
m) a sinusoidal waveform oscillator generates sine waves for smooth motor speed in low speed in the low speed mode;
n) in the low speed mode a sine wave is sent to each stator in the brushless motor, and each succeeding stator receives a sine input which is a number of degrees advanced from that sent to a previous stator;
o) in the high speed mode, the brushless motor is driven by each channel of a PWM output, which is regulated by a feedback loop from a Hall sensor output;
p) in the transition phase from the low speed mode to the high speed mode, the modulation of the PWM square waves with sine waves is done by:
  i) having a center locked phase alignment between each wavelength, and by using a fixed frequency between wavelengths;
  ii) each sine wave adds to or subtracts from a standard PWM output and creates a modulated PWM waveform;
q) sine commutation drives the brushless motor by means of sine wave input to stators, the sine wave being incrementally out of phase to each successive stator in increments that are 360 degrees divided by the number stators, whereby a rotor is attracted to each stator 14 in turn as the sine wave input at a first stator increases to its maximum voltage, and then to a second stator as its voltage increases while the first stator's voltage decreases;
r) the low speed mode operates when the brushless motor has an rpm number less than a presselected number in the range of 200-300 rpm, the high speed mode operates when the brushless mote has an rpm number greater than a preselected number in the range of 200-300 rpm; and the transition phase occurs at a transition speed in the range of 200-300 rpm, in order to effect smooth operation of the brushless motor speeds above and below the transition speed;
s) the high speed mode uses closed loop feedback which sends Hall sensor outputs to the programmable controller which determines if a speed of the brushless motor is high enough and then regulates that speed by means of PID looping;
t) a result of PID looping determines a duty cycle of a square wave sent to a power stage controller which supplies a PWM driver, the driver sends a phased output to drive each stator of the brushless motor, the PID looping varies the duty cycle according to proportional, integrated, and differential speed error, commutation is controlled by switching through a commutation pattern every time Hall sensors change polarity, and three PWMs run a common duty cycle, but only one PWM output is enabled at a time;
u) the low speed mode varies a PWM duty cycle according to preset values held in a sine wave lookup table, position in the lookup table is sequential and is switched by a timer interrupt to control speed of the brushless motor, each stator thereof having its own PWM output source, each source being a set number of degrees apart in the sine table, the PWM duty cycle being continuously varied in a sine wave pattern, and torque being a fixed factor applied to the sine wave lookup table values before loading into a PWM duty cycle control register;
v) the low speed mode uses synchronous drive consisting of three PWMs, sine wave modulated;
w) the transition phase uses H-Bridge PWM drivers, a fixed PWM output frequency, and a phase alignment that is center locked;
x) if a speed regulation of the brushless motor is due, a new speed is calculated by taking a proportional and integral error between a required speed and a measured speed, from which a new value for a PWM duty cycle is then calculated, and a regulation loop is interrupt driven to ensure that it occurs regularly;

The brushless motor control system thus provides a wide range of smooth and precisely controlled speeds for pan-tilt-zoom surveillance cameras, using a seamless combination of high and low speed commutation modes for a brushless motor. The system preloads PID and lookup table registers used by a programmable controller for a smooth transition from high speed mode to low speed mode, and from low speed mode to high speed mode, phase locking a sine position during transitions, in order to give a surveillance camera an ability to quickly move from one target to another at up to 100 degrees per second yet track objects that are moving very slowly.

DETAILED DESCRIPTION

All elements will first be introduced by reference to figures, then the functionality and interactions of each element with each other element will be described, and finally the preferred embodiment of the novel device will be described in detail.

Figure 1:
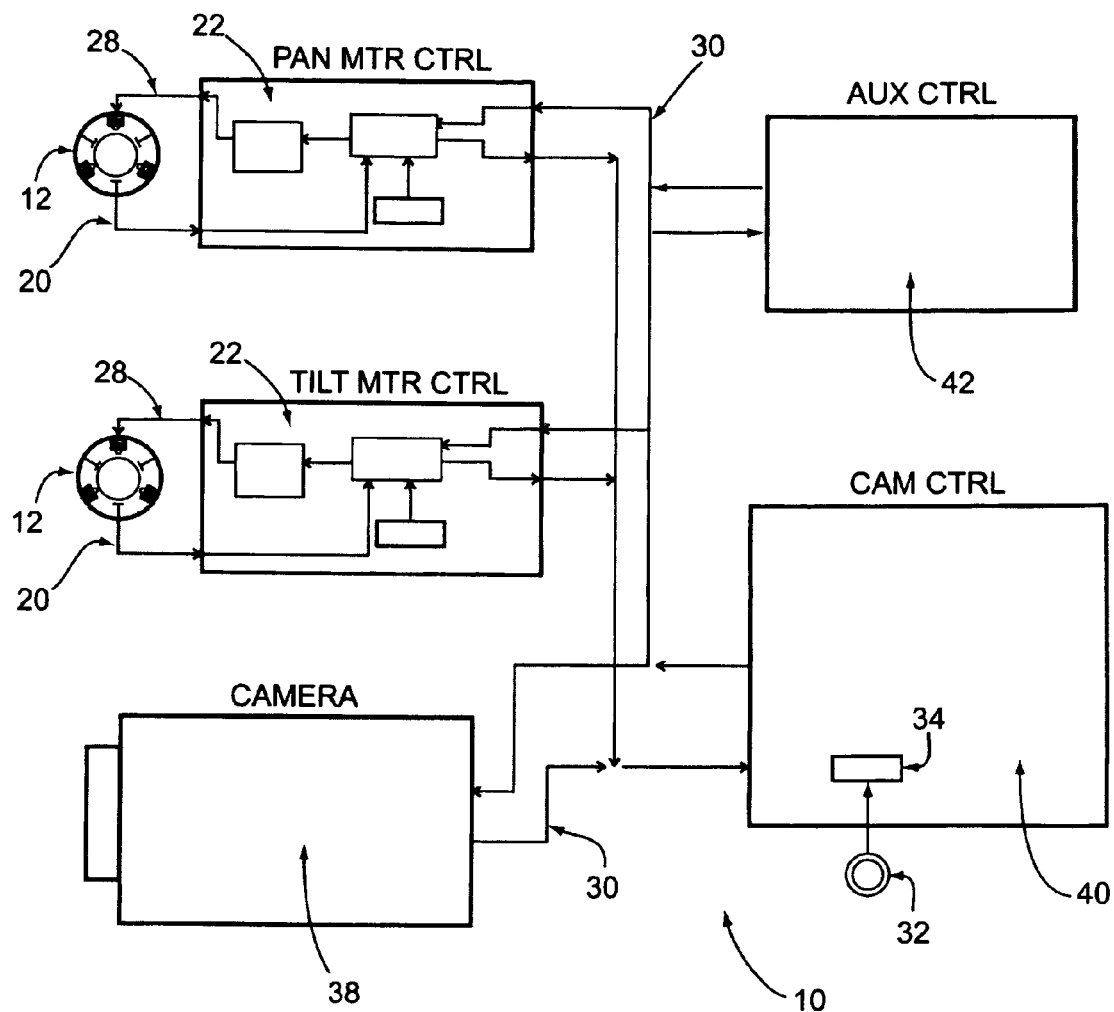
FIG. 1 shows a general diagram of all relevant electronic and mechanical elements of the Brushless Motor Speed Control System.

FIG. 1 diagrams the entire Brushless Motor Speed Control System 10 wherein each motor driver card 22 receives Hall sensor outputs 20 from the motor 12, and depending on the operating mode and the required speed, provides the appropriate PWM output 28 to drive the motor 12. A camera control card 40 can issue VISCA (Video System Control Architecture) formatted commands on a TTL serial bus 30 to either Pan or Tilt motor driver cards 22, or to the camera 38. Motor driver cards 22 can command each motor 12 to go to a specific position, report the current position by means of a digital resolver 32, drive at a specific speed and direction and stop (see FIG. 8). There will also be commands to read back data such as current speed and PWM levels and commands to set motors operational parameters such as closed loop gains, acceleration rates, brake force etc. An auxiliary control card 42 can allow for three independent IC bus protocol ports so that pan, tilt and zoom positions can be fed to it from each source, thereby enabling external dedicated secure control pathways.

Figure 2:
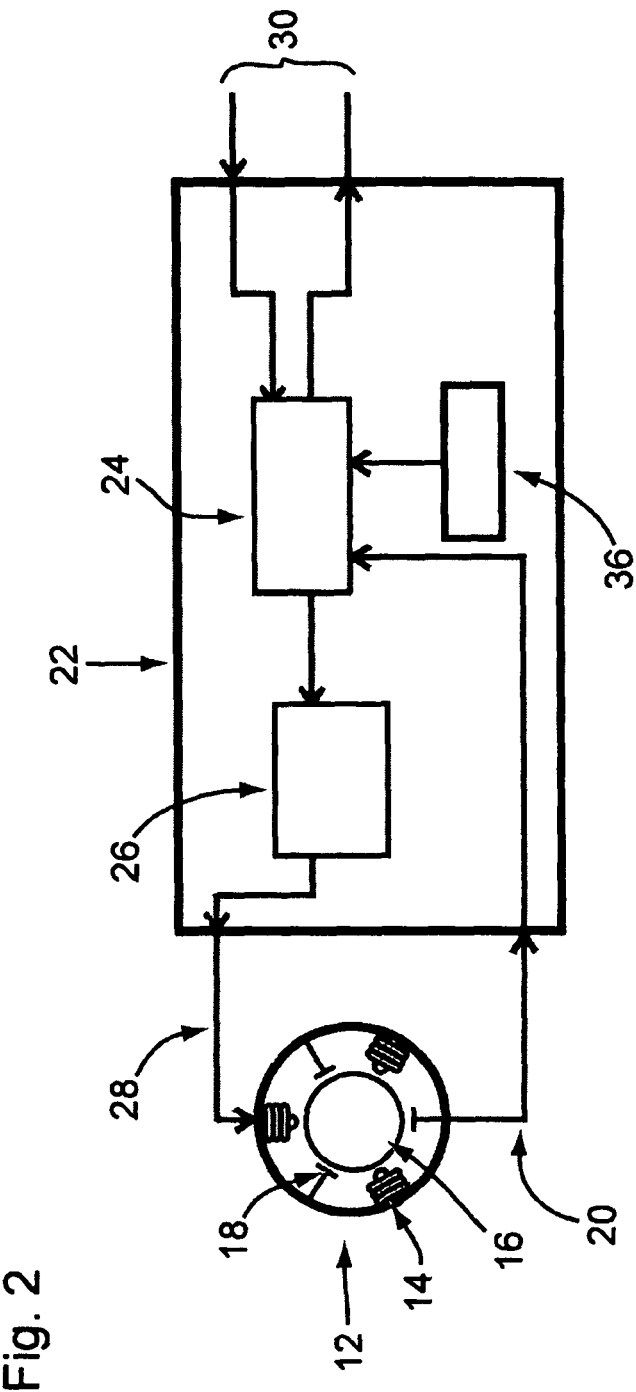
FIG. 2 shows a Motor Driver Card and how it connects to a motor.

FIG. 2 details the motor driver card 22 used to regulate the speed of PTZ motors 12 as directed from external sources such as the camera control card 40 or the auxiliary control card 42, by means of the TTL Serial Bus 30. Each motor 12 includes a series of stationary wire-wound stators 14 affixed around its inner circumference. A central rotating multipolar magnet called a rotor 16 generates the rotary motion required to move the camera 38 around each axis when provided with an appropriately timed PWM output 28 through the stators 14. Hall Sensors 18 are positioned around the motor 12 to detect polarity changes as it rotates, and provide a speed regulation feedback signals to the programmable controller 24 by means of the sensor output 20 pathway. The programmable controller 24 generates the control signals for the PWM driver chip 26 which supplies the PWM output 28 for the motor 12. The driver card 22 has its own resolver driver 34 chip which detects and processes motor 12 positions for each axis by means of the digital resolver 32, and forwards the angular positional data to the programmable controller chip 24. Finally, a sinusoidal waveform oscillator 36 generates the sine waves 44 necessary for smoother Low Speed Mode 48, which will be illustrated in FIGS. 3 & 4, and explained in more detail below.

Figure 3:
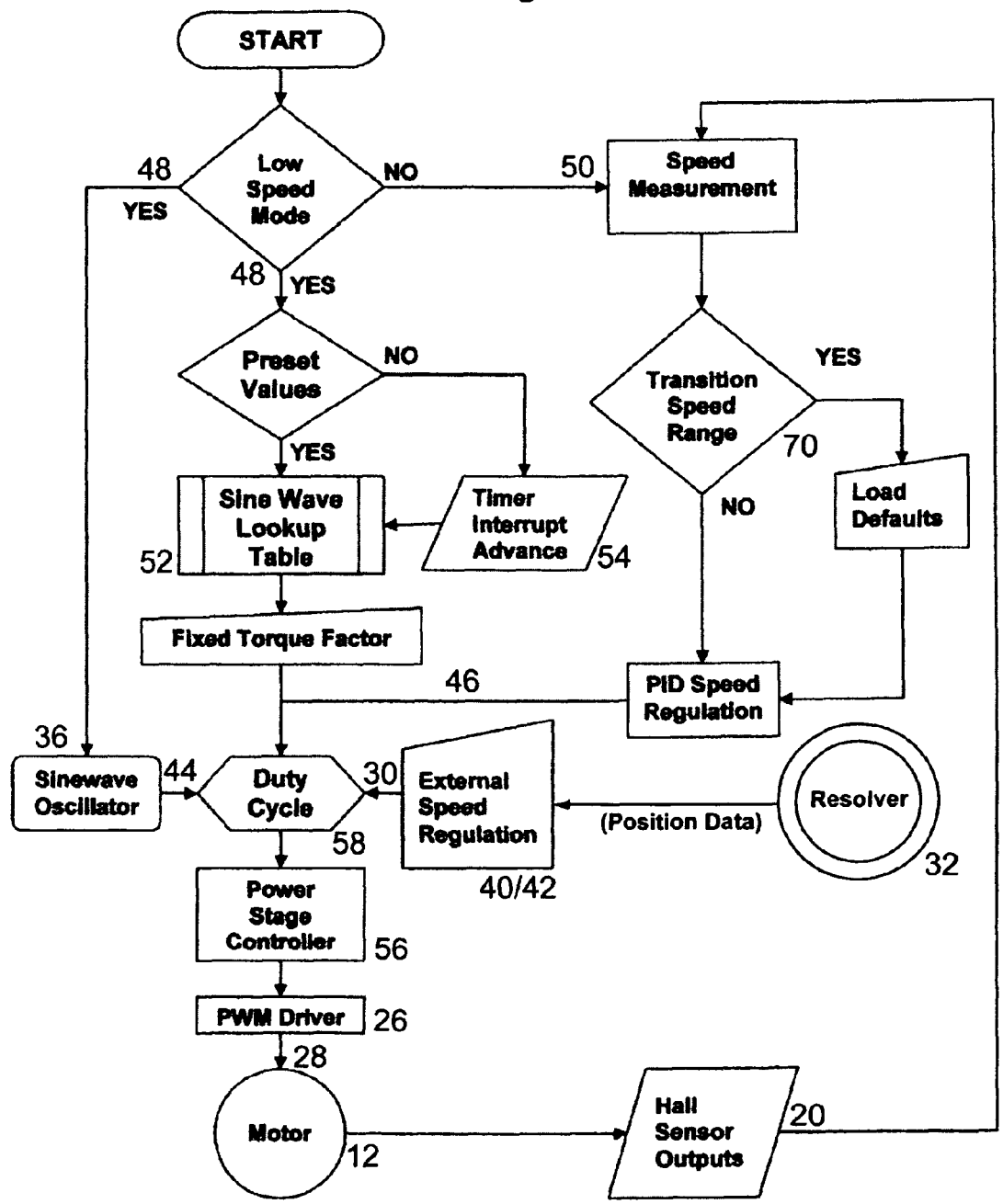
FIG. 3 shows a Flow Chart illustrating the transition between modes, some of the software functions of its programmable controller chip, and how it controls the motor.

FIG. 3 flowcharts the basic functional elements necessary to generate either low speed mode 48 or high speed mode 50, and demonstrates a smooth transition between the two modes. With the exception of external inputs such as those from the TTL bus 30, sine oscillator 36, or Hall sensor outputs 20, as well as the power stage controller (PSC) 56, PWM driver 26, and the motor 12, the remaining elements on this flowchart illustrate programmable operations within the onboard programmable controller 24. In order to properly understand this flowchart, these operational terms need more complete definitions; therefore a detailed explanation of its elements will be postponed until the fuller description in the preferred embodiment below.

Figure 4:
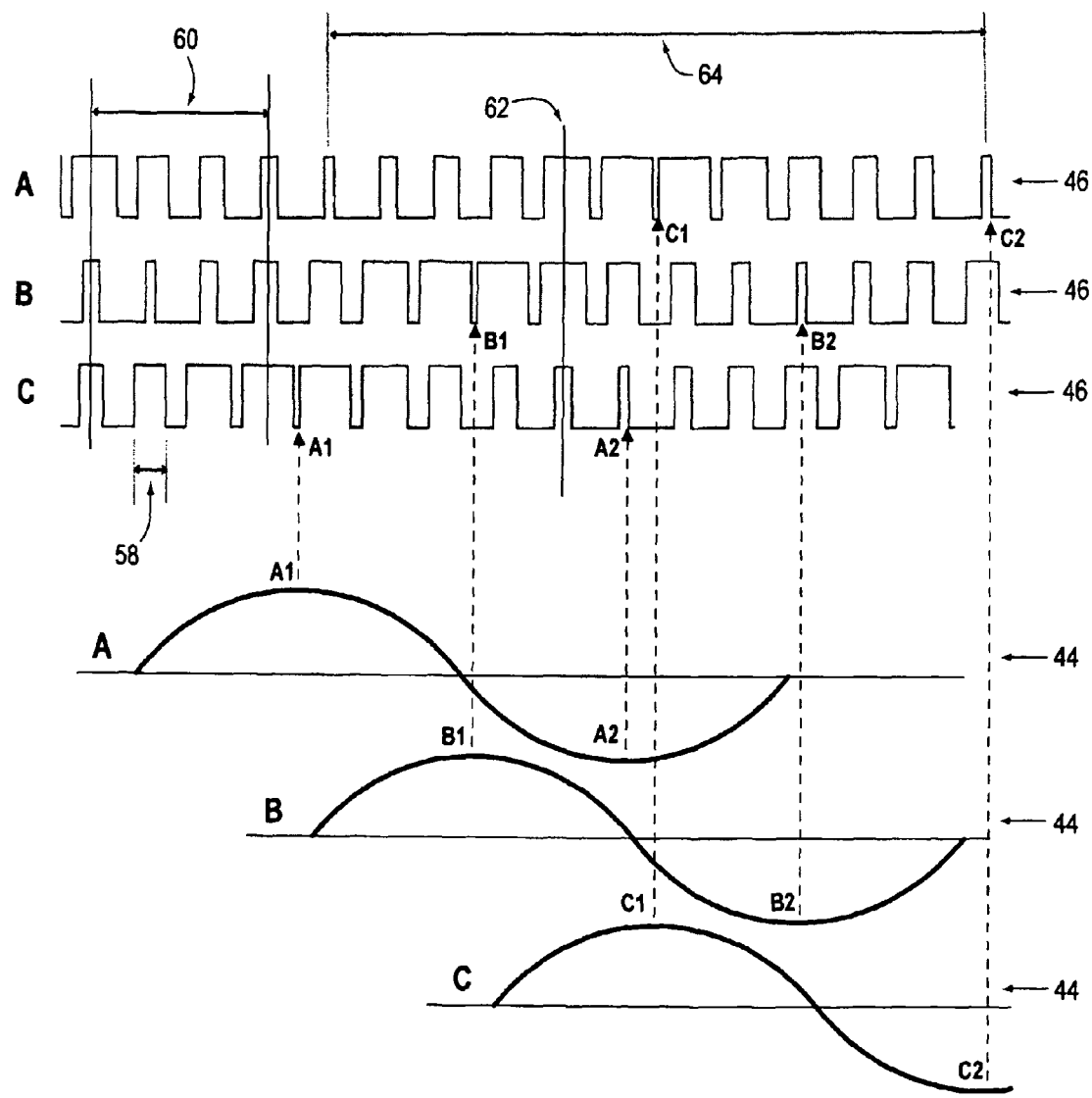
FIG. 4 shows the waveforms of the transition between modes.

FIG. 4 illustrates by means of wave diagrams, the transition from low speed mode 48 to high speed mode 50. In low speed mode 48 a sine wave 44 is sent to each stator 14, and each stator 14 receives a sine input which is 120 degrees advanced from that sent to the previous stator 14. In high speed mode 50, the motor 12 is driven by each channel of the pwm output 28, which is regulated by a feedback loop from the hall sensor outputs 20. (see FIG. 3) The smooth transition from low speed mode 48 to high speed mode 50 is created by modulating the PWM square waves 46 with sine waves 44 as shown in FIG. 4. This is made possible by having a center locked phase alignment 62 between each wavelength, and by using a fixed frequency 60 (16 kHz, for instance) between wavelengths. FIG. 4 shows by means of broken arrows where each sine wave 44 adds to (A1, B1, C1) or subtracts from (A2, B2, C2) the standard PWM output 28 (compare with FIG. 9), and which creates a modulated PWM waveform which enables the transition from low speed mode 48 to high speed mode 50.

Figure 5:
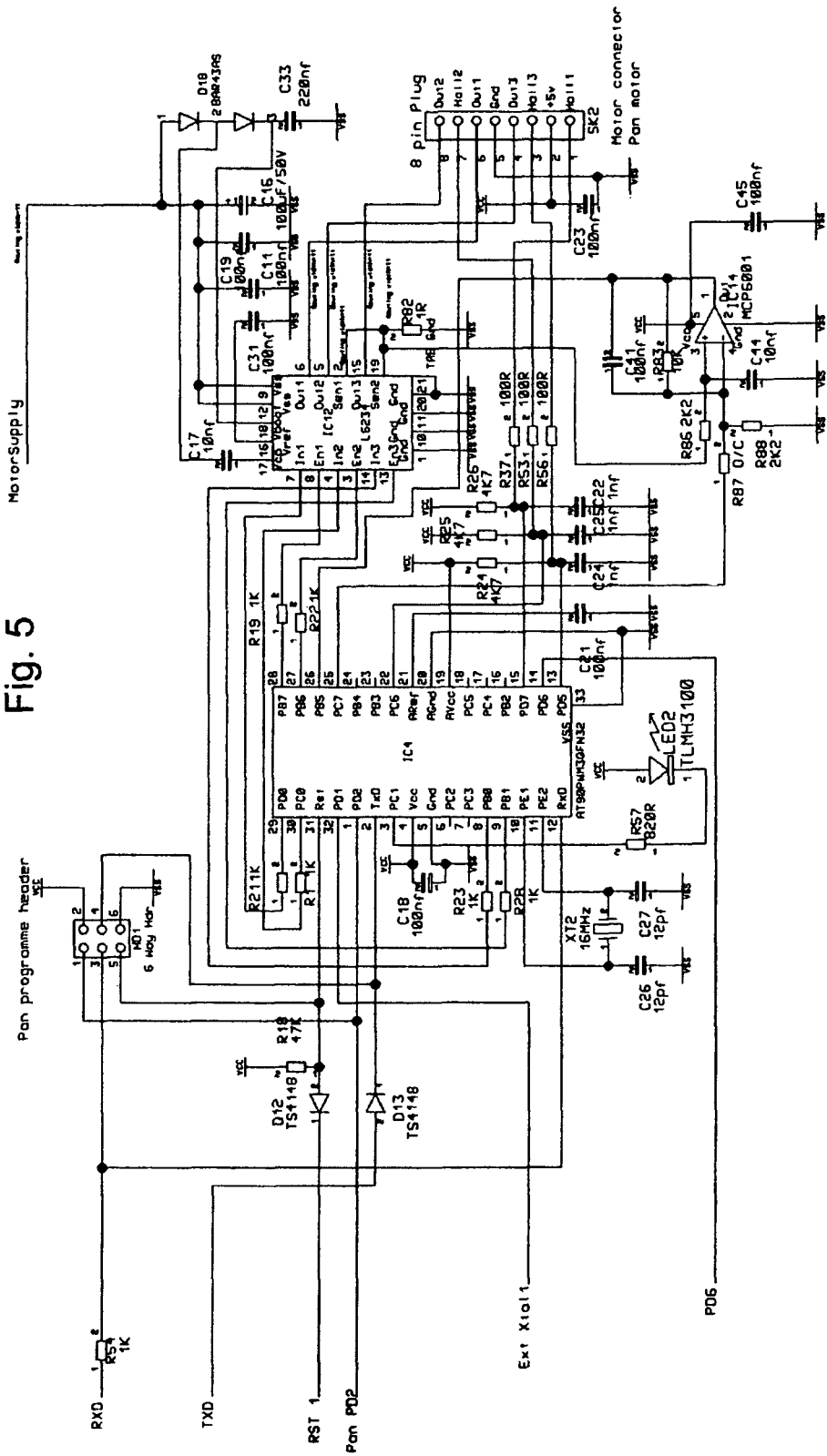
FIG. 5 shows a schematic of the Motor Driver Card.
Figure 6:
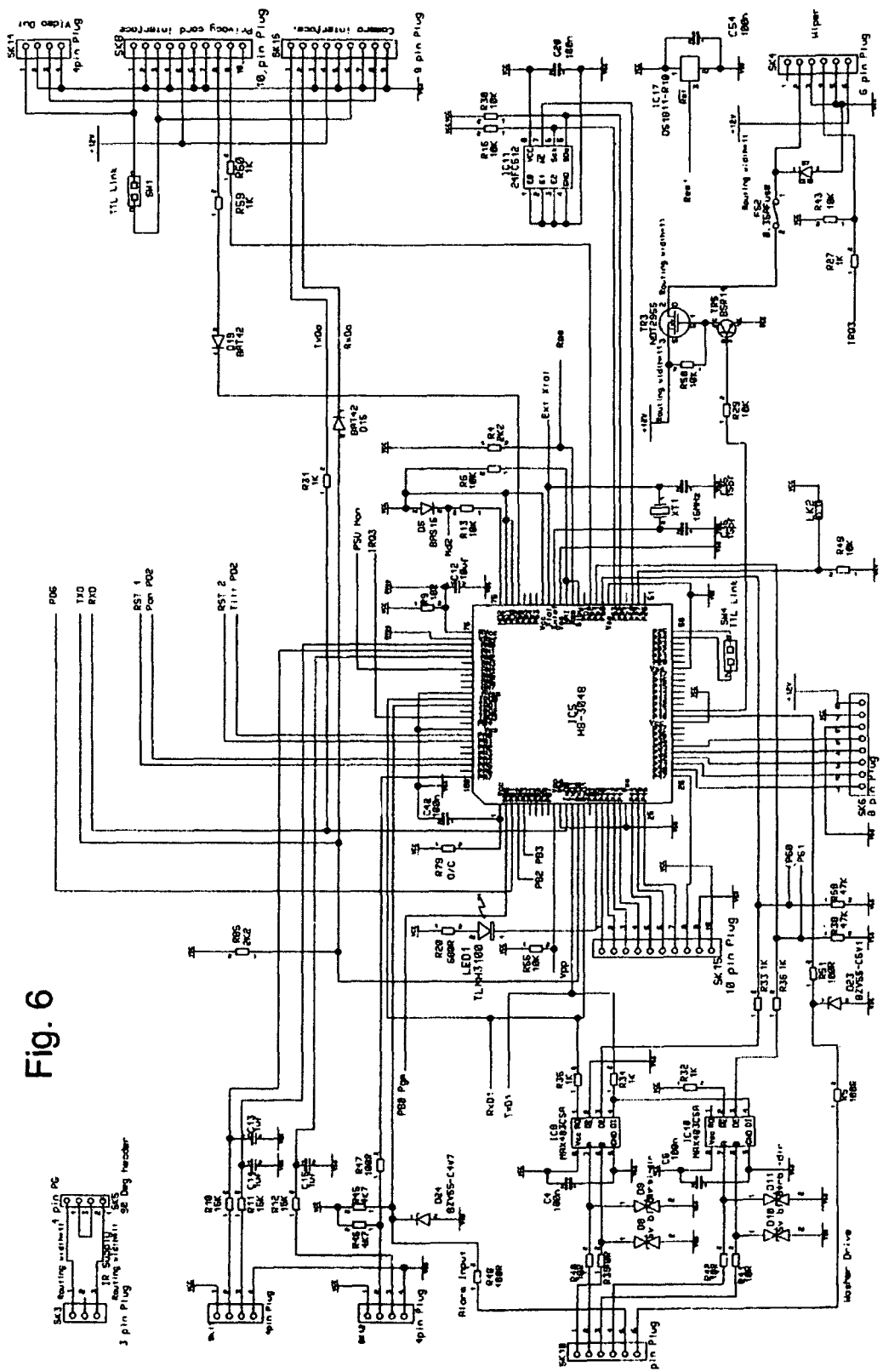
FIG. 6 shows a schematic of the Camera Control Card.
Figure 7:
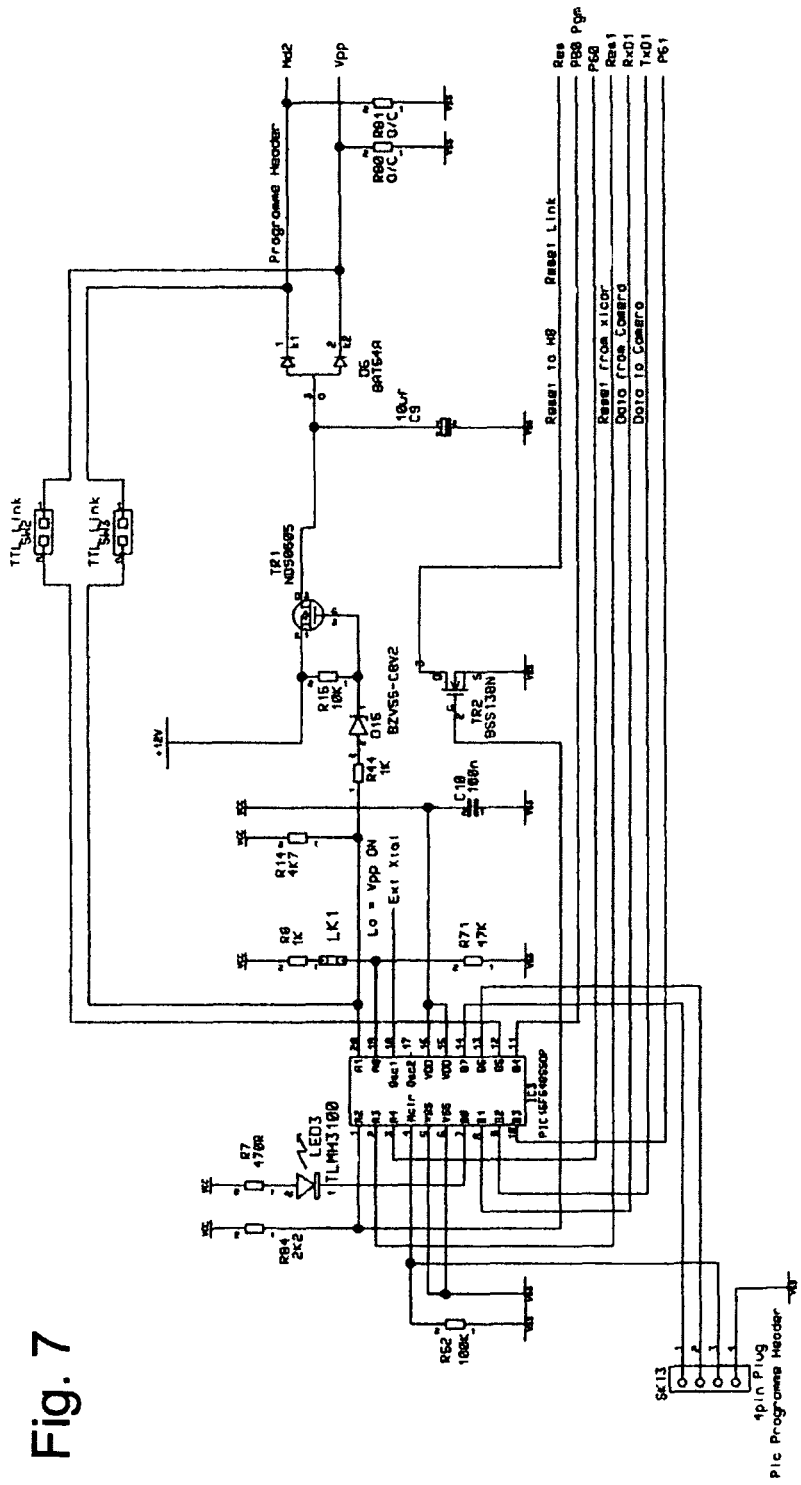
FIG. 7 shows a schematic of the TTL Serial Bus.
Figure 8:
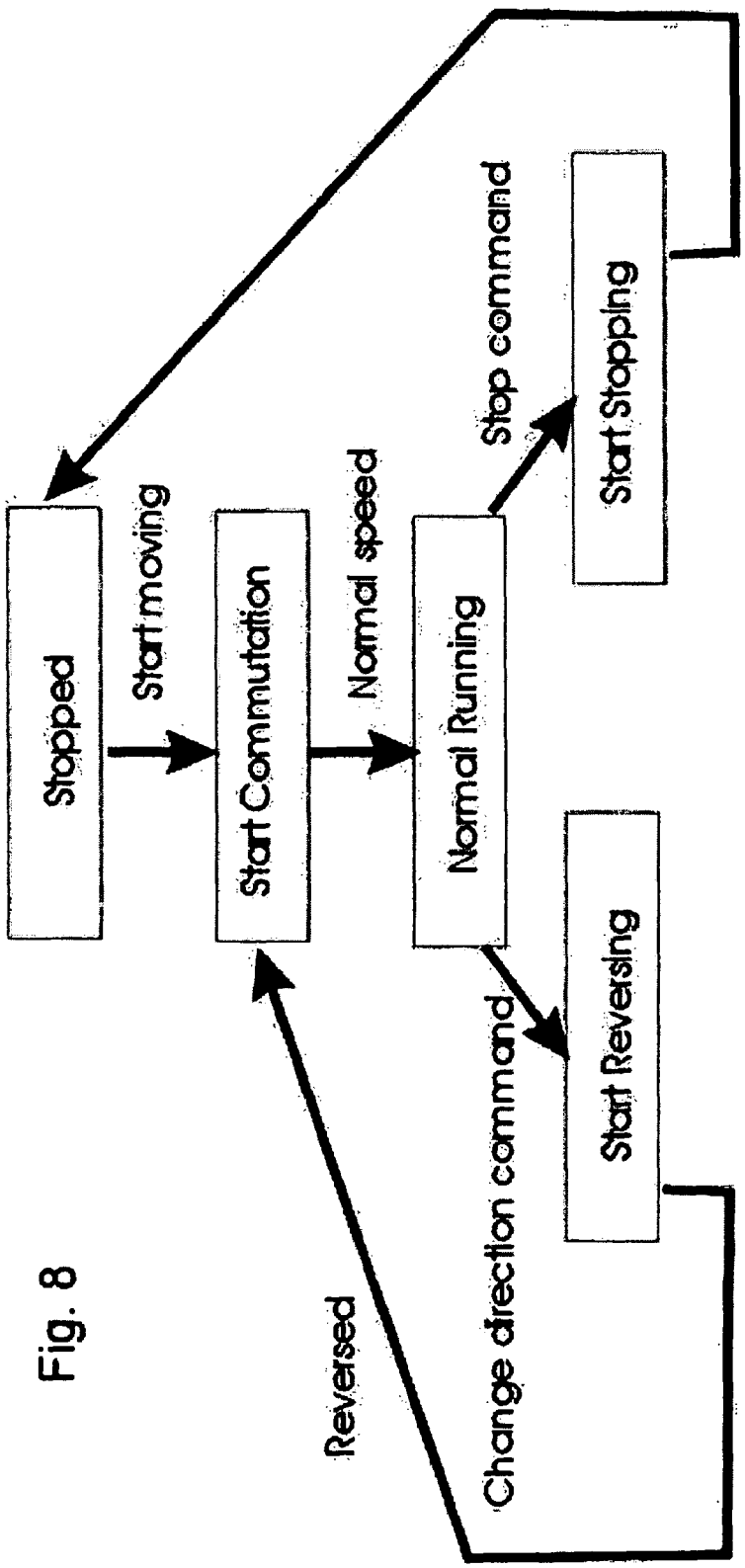
FIG. 8 shows a flowchart of basic motor operations.
Figure 9:
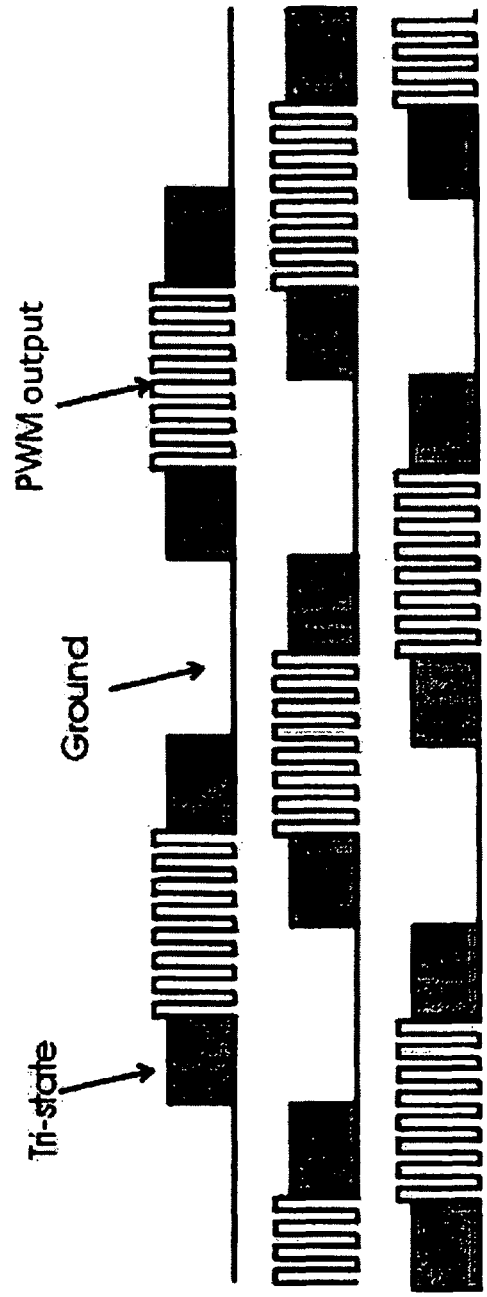
FIG. 9 shows PWM output waveforms in high speed mode.

FIG. 5 shows a schematic of the motor driver card 22 using an Atmel 90 PWM programmable controller 24. FIG. 6 shows a schematic of the camera control card 40, and FIG. 7 a schematic of the TTL serial bus 30 circuitry. FIG. 8 flowcharts the non speed related motor control operations, and FIG. 9 shows the PWM output 28 waveforms in high speed mode 50.

The preferred embodiment of the brushless motor speed control system 10 will now be described in detail. In order to properly understand the core concepts of this invention, especially as illustrated by FIGS. 3 & 4, there should be consistent use of terminology relevant to this field. Therefore a brief review of the terms relevant to brushless motors, drive and control methods and speed modes will now be undertaken.

The two methods used to control the running speed of a motor are open loop (synchronous) or closed loop (asynchronous or feedback). Open loop (synchronous) control is the application of direct power to the motor without feedback error correction. Varying the power applied to the motor directly varies the motor speed. Closed loop (asynchronous) control is a method in which the power input of a motor is adjusted by a control circuit which compares a reference signal with a feedback signal proportional to an output parameter (e.g., speed) of the motor to modify the power input of the motor so as to achieve or maintain some desired operating condition of the motor (e.g., constant running speed). The specific method of closed loop motor control employed in this invention will be discussed below.

The two methods used to drive (turn) an electric motor 12 are sine (sinusoidal) or block commutation. A commutator in this application is a means of electronic switching that periodically reverses the current of the stators 14 in an electric motor 12 in order to efficiently turn the rotor 16.

The sine commutation method drives the motor by means of sine wave 44 input to each stator 14. In order to turn the rotor 16, the sine wave 44 input at each stator 14 is out of phase by that fraction a circle divided by the number stators 14. If three stators 14 are used, then each stator 14 is 120 degrees out of phase from the last stator 14. By this means the rotor 16 is attracted to each stator 14 in turn as the sine wave 44 at one stator 14 increases to its maximum voltage, and then to the next stator 14 as its voltage increases while the previous stator's 14 voltage decreases. Thus the motor 12 turns by means of the sine wave 44 commutation method.

The block commutation method drives a motor 12 by means of square wave 46 input to each stator 14. When driving a motor 12 by this method, a higher number of stators 14 are usually required in order to prevent torque losses during rotation from one stator 14 to the next, which is due to the on-off nature of square wave 46 inputs. The disadvantages of block commutation are the cost for the rotor position sensor, tachogenerator, and rotary encoder, plus the torque jump during switching between the individual phases, which appears as torque ripple. Recent efforts to remedy these problems include powering with sine-valued pulse-width modulation (PWM).

While PWM block commutation commonly drives brushless DC motors 12 efficiently at high speeds, the square wave 46 input is incapable of driving at low speeds without unwanted jittering because the phase transitions are not smooth enough.

For purposes of this invention, two speed modes and two transition modes are defined, with the low speed mode 48 approximately 200-300 rpm or less, and high speed mode 50 approximately 200-300 rpm or greater. Transition modes are defined as the direction from which a speed change passes through the transition speed 70 range (approximately 200-300 rpm). Therefore, LH mode 66 is defined as a low to high speed transition, and HL mode 68 is a high to low speed transition. As will be shown below, because two commutation methods are employed, different methods are required to effect a smooth transition depending on whether one is going from sine to block or block to sine commutation.

A brushless motor speed control system 10 with a wide speed range, including ultra low speeds, requires a means to drive (turn) the motor efficiently, and methods to smoothly control its speed at all required ranges. As described above, the disclosed speed control system 10 uses block commutation at high speed mode 48 and sine commutation at low speed mode 50. Each of these modes will now be discussed in detail, as well as the transition speed 70 modes required to effect smooth operation at all speeds.

High Speed Mode:

The motor 12 is driven in high speed mode 50 by means of square wave 46 PWM output 28. As shown in FIG. 3, the speed is controlled with the closed loop feedback method which sends hall sensor outputs 20 to the programmable controller 24 which determines if the speed is high enough (above 200-300 rpm), and then regulates that speed by means of PID looping. The result determines the duty cycle 58 of the square wave 46 sent to the power stage controller 56, which supplies the PWM driver 26, which sends the phased output 28 to drive each stator 14 of the motor 12. PID looping varies the duty cycle 58 according to proportional, integrated, and differential speed error. Commutation is controlled by switching through commutation pattern every time hall sensors 18 change state (polarity). All three PWMs run the same duty cycle, but only one PWM output is enabled at a time.

Low Speed Mode:

The relationship between the position of the rotor 16 and stator 14, and the time that the electromagnets change their polarity, is known as "timing". In high speed mode 50 the speed is calculated from the timing between each hall sensor 18 interrupt sent to the programmable controller 24. But the hall sensors 18 are not perfectly spaced around the motor 12 so there will be some speed jitter. Averaging the sensor output 20 can diminish this effect, while an optical encoder could solve this problem. Most application notes state that sine wave 44 commutation requires an optical encoder but this device adds a significant amount to the price of the motor controller. The disclosed method achieves the same speed range without the need for an optical encoder, and the hall sensors may be eliminated as well.

Synchronous mode varies the PWM duty cycle 58 according to preset values held in sine wave 44 lookup table 52. Position in the LUT 52 is sequential and is switched by timer interrupt 54 which controls speed in the low speed mode 48. Each stator 14 has its own PWM output 28 source, each source is 120 degrees apart in the sine table, and the PWM duty cycle 58 is continuously varied in a sine wave 44 pattern. Torque is a fixed factor applied to the sine wave 44 lookup table 52 values before loading into PWM duty cycle 58 control register.

To drive a motor 12 in low speed mode 48 while employing the same feedback loop of the high speed mode would require a larger number of Hall Effect sensors for it to be able to rotate smoothly at ultra low speeds. Instead, as shown in FIG. 3, the motor 12 is driven synchronously in low speed mode 48, using a timer interrupt 54 to advance the programmable controller's 24 lookup table (LUT) 52. A timer interrupt 54 is used when a certain event must happen at a given frequency, such as causing the motor 12 to rotate synchronously. Therefore, synchronous timing in low speed mode 48 is enabled by the timer interrupt 54, which provides the appropriate duty cycle 58 to drive each phase of the PWM output 28 to the motor 12. In order to run at speeds below 200 rpm, the motor 12 can be operated open loop in a stepper mode. In this mode the commutation is switched from one step to the next under timer interrupt 54 and the hall sensors 18 are ignored. In summary, low speed mode 48 uses synchronous drive which consists of three PWMs sine wave 44 modulated. The ability to switch into stepper motor mode once the speed drops below 200-300 rpm means that there is effectively no lower limit to the speed of the motor 12.

Transition Modes:

A key element to the smooth operation of a dual commutation mode speed control system 10 requires that the transition between speed modes be smooth. This functionality is made possible by faster and more versatile programmable controllers, software programs, and novel capabilities of H-Bridge PWM drivers. As shown in FIG. 4, other elements that make a smooth transition possible are the use of a fixed PWM output 28 frequency 60, and a phase alignment 62 that is center locked. As outlined above, the two transitions possible are LH mode 66 and HL mode 68, so we will now discuss the unique means to maintain consistent transition speeds throughout these ranges. The specifics of this discussion refer to FIGS. 3 and 4 throughout.

LH Mode:

The transition from low speed mode 48 to high speed mode 50 is shown in FIG. 3, at the point where the operating speed falls within the transition speed 70 range, the programmable controller 24 pre-loads default error values into the PID regulation loop in order to achieve a smooth transition.

As shown in FIG. 4, the PWM output 28 goes from sine wave 44 to modulated square wave 46 during the transition speed 70 range to unmodulated square wave 46 in high speed mode 50.

HL Mode:

The transition from high speed mode 50 to low speed mode 48 is made possible by supplying a similar set of preset values (see FIG. 3) to the sine wave lookup table 52 instead of using the timer interrupt 54 to synchronize motor 12 driving. In this case, the current hall sensor 18 position from high speed mode 50 is used to start the sine wave 44 pattern at the nearest point in its cycle so that it is synchronized to the rotation of the motor 12. While in synchronous mode, drive slip can be detected by monitoring the hall position sensors 20 relative to the sine wave 44. Note that there is also a baseline torque input (see fixed torque factor in FIG. 3) added to the duty cycle 58 in low speed mode 48.

Software Implementation:

Interrupts from the hall sensors 18 trigger routines that take speed measurements by reading timer0. These are stored in an array so that a running average can be taken from the last 24 samples. The position of the rotor 16 is also read from the hall sensors 18 and the next commutation step is found and sent to the motor drive chip. At the same time the current duty cycle 58 value is read and loaded in the power stage controller (PSC) 56 hardware which generates the PWM drive output 28 to the motor 12 windings.

Asynchronously, the main software loop runs and reads commands in from the TTL serial bus 30 port, which are decoded and processed by the programmable controller 24. After that, if a speed regulation is due, the new speed is calculated by taking the proportional and integral error between the required speed and the measured speed. A new value for the PWM duty cycle is then calculated. Currently the PWM has 12 bit resolution and the error values are 16 bit signed. The regulation loop could be changed to be interrupt driven to ensure that it occurs regularly. Also the PWM duty cycle 58 is only reloaded 24 times per revolution i.e. as each hall interrupt occurs. As speed variation cannot be measured between hall sensors, there is little point in make PWM adjustments more frequent.

As shown in FIGS. 1-3, the resolver 32 is an angular positioning sensor which provides axis positional data to the camera control card 40 by means of the resolver driver chip 34, and this allows the motor driver card 22 to turn a camera 38 to a specific position at a specific speed. PTZ position data is also sent to the auxiliary control card 42 on a high speed IýC bus from the camera control card 40. The camera control card 42 manages the preset position control loop and is solely responsible for sending speed commands to the motor driver cards 22.

The dual mode of operation provides a very large range of speed control giving the camera the ability to quickly move from one target to another at up to 100 degrees per second and track objects moving very slowly. For practical purposes that can be described as one 360 degree rotation per month, although the system could go slower if there was a need. No product on the market currently has anywhere near this range of speed of operation or ultra low speed capability.

Minimum slow speed possible approaches zero rpm and is only limited by the size of the counter timer and the clock rates provided to it. Currently there are 64 steps in the sine wave table and the maximum rate we clock through is around 300 rpm with a motor using 4 pole pairs. In the current programmable controller 24 design, the bottom speed is set to 30 rpm at the motor, but the current design can operate down to 1 rpm. Motors with fewer pole pairs will rotate faster.

Top speed is limited by supply voltage and CPU processing speed. Currently we can go beyond the rated specification of the input stage of the gearbox, 10,000 rpm and have measured speeds of over 18,000 rpm. Again, motors with fewer pole pairs will rotate faster. In the programmable controller 24 design, the standard power supply voltage limits the top speed of the motor 12, but we aim to get up to 12,750 rpm. The current design will go up to nearly 18 k but it needs 30V to do it. Using a Maxon motor there are 24 interrupts per revolution so that the CPU is clocking at the maximum speed available.

There are three Hall sensors 18 in all of the motors 12 we have tested and they commutate on the rising and falling edges. The 4 pole pair Maxon motor gets 24 edges per revolution. The limitations are the lookup table size which gives some granularity to the slowest speeds, but one can achieve 64 steps when on full zoom. So by storing a quarter of the sine wave, a potential to quadruple the resolution without using up any more space is possible. The sine mode is limited in its maximum speed because it is synchronous and it does not develop maximum torque in the motor, so there is quite a lot of heating in the motor, which means that it's basically operating at maximum stall current all the time in this mode.

The core uniqueness of the brushless motor speed control system 10 is the provision of a very wide speed control range with minimal processing power and cost. This is achieved by means of seamless integration of commutation modes, pre-loading the PID & LUT registers for a smooth transition, and phase locking the sine position during transitions.

The foregoing description of the preferred apparatus and method of implementation should be considered as illustrative only, and not limiting. Other embodiments are not ruled out or similar methods leading to the same result. Other techniques and other materials may be employed towards similar ends. Various changes and modifications will occur to those skilled in the art, without departing from the true scope of the invention as defined in the above disclosure, and the following general claims.

I claim:

1. A brushless motor control system for pan-tilt-zoom surveillance cameras, the system comprising:
    a brushless motor with a plurality of stator inputs;
    a pulse-width modulation (PWM) driver connected to the plurality of stator inputs;
    a sinusoidal waveform generator connected to the PWM driver;
    a programmable controller connected to the PWM driver, the programmable controller configured to operate the brushless motor:
        a) in a low-speed mode by sinusoidal synchronous commutation, wherein the sinusoidal waveform generator generates sine waves in the low speed mode;
        b) in a high-speed mode by block commutation provided by the PWM driver, the programmable controller regulating the PWM driver based on feedback from a hall sensor;
        c) in a transition phase between the low-speed mode and the high-speed mode, the programmable controller configured to modulate integrated pulse-width modulation (PWM) square waves from the PWM driver with sine waves by using a center locked phase alignment between each wavelength of the PWM square waves.

2. The brushless motor control system of claim 1, wherein the low-speed mode operates without the need for digital encoders, by the programmable controller synchronously driving multiple, sine wave modulated PWMs.

3. The brushless motor control system of claim 1, wherein the high-speed mode operates by a motor driver card that receives Hall sensor outputs from the brushless motor and provides appropriate PWM output to drive the brushless motor at a selected speed.

4. The brushless motor control system of claim 1, wherein the high-speed mode employs trapezoidal Hall Effect feedback looping with programmable controller Proportional, Integrated, Differential (PID) error correction.

5. The brushless motor control system of claim 1, wherein a camera control card issues Video System Control Architecture formatted commands on a serial bus to a Pan motor driver card or to a Tilt motor driver cards or to a camera.

6. The brushless motor control system of claim 1, wherein motor driver cards can command the brushless motor to go to a specific position, report the current position by means of a digital resolver, drive at a specific speed and direction, and stop.

7. The brushless motor control system of claim 1, wherein motor driver cards command the brushless motor to send back data, such as current motor speed and PWM levels, the motor driver card configured to set motor operational parameters.

8. The brushless motor control system of claim 7, wherein the motor operation parameters include one or more of closed loop gains, acceleration rates, and brake force.

9. The brushless motor control system of claim 1, wherein an auxiliary control card provides three independent integrated circuit bus protocol ports so that pan, tilt and zoom controls have external dedicated secure control pathways.

10. The brushless motor control system of claim 1, wherein the programmable controller receives commands from a motor driver card to regulate the speed of pan/tilt/zoom (PTZ) motors as directed from an external source such as a camera control card or an auxiliary control card.

11. The brushless motor control system of claim 1, wherein the brushless motor comprises a series of stationary wire-wound stators affixed around a central rotating multipolar magnet rotor that generates rotary motion to move a surveillance camera around each axis.

12. The brushless motor control system of claim 1, wherein Hall sensors are positioned around the brushless motor, the Hall sensors configured to detect polarity changes of a rotor as it rotates, and to provide speed regulation feedback signals to the programmable controller.

13. The brushless motor control system of claim 1, wherein the programmable controller generates control signals for the PWM driver which supplies PWM output for the brushless motor.

14. The brushless motor control system of claim 1, wherein a resolver detects and processes motor positions for each axis and forwards angular positional data to the programmable controller.

15. The brushless motor control system of claim 1, wherein, in the low-speed mode, the PWM driver generates sine waves being incrementally out of phase to each successive stator in increments that are 360 degrees divided by the number of stators.

16. The brushless motor control system of claim 1, wherein the programmable controller activates the low-speed mode when the brushless motor has an rpm less than 200 rpm.

17. The brushless motor control system of claim 1, wherein the programmable controller activates the high-speed mode when the brushless motor has an rpm greater than 300 rpm.

18. The brushless motor control system of claim 1, wherein the transition phase occurs at a transition speed in a range of 200-300 rpm.

19. The brushless motor control system of claim 1, wherein the programmable controller is configured to use PID looping to determine a duty cycle of a square wave sent to the PWM driver, the PWM driver configured to send a phased output to drive each stator of the brushless motor, wherein the PID looping varies the duty cycle according to proportional, integrated, and differential speed error, and wherein the PWM driver generates three PWMs outputs over a common duty cycle, wherein only one PWM output of the three PWMs outputs is enabled simultaneously.

20. The brushless motor control system of claim 1, wherein the programmable controller, in the low-speed mode varies a PWM duty cycle according to preset values held in a sine wave lookup table, wherein the preset values are sequential and are switched by a timer interrupt to control speed of the brushless motor via the PWM duty cycle, and wherein torque is a fixed factor applied to the preset values before loading into the programmable controller.

21. The brushless motor control system of claim 20, wherein the brushless motor is driven synchronously in low-speed mode using the timer interrupt to advance the preset values in the lookup table to adjust the PWM duty cycle.

22. The brushless motor control system of claim 1, wherein in order to run at speeds below 200 rpm, the brushless motor can be operated by the programmable controller in an open loop stepper mode, by which commutation is switched from one step to a next step under a timer interrupt and the Hall sensors are ignored.

23. The brushless motor control system of claim 1, wherein the PWM driver is an H-Bridge PWM driver, and wherein the PWM driver outputs a PWM signal with a fixed PWM output frequency and a center-locked phase alignment.

24. The brushless motor control system of claim 1, wherein the programmable controller, when switching from the low-speed mode to the high-speed mode, pre-loads default error values into a PID regulation loop in order to achieve a smooth transition.

25. The brushless motor control system of claim 1, wherein the programmable controller, when switching from the high-speed mode to the low-speed mode, uses, a current Hall sensor position to start a sine wave pattern at a nearest point in its cycle so that the sine wave pattern is synchronized to match a rotation of the brushless motor.

26. The brushless motor control system of claim 1, wherein the programmable controller, while in the low-speed mode, detects drive slip by monitoring Hall position sensors relative to the sinusoidal waveform.

27. The brushless motor control system of claim 1, wherein the programmable controller monitors interrupts from Hall sensors and initiates routines that take speed measurements of the brushless motor and store the speed measurements in an array so that a running average can be taken, and wherein a position of a rotor of the brushless motor is read from the Hall sensors.

28. The brushless motor control system of claim 1, wherein the programmable controller reads commands from a serial bus port, the commands being decoded and processed by the programmable controller.

29. The brushless motor control system of claim 1, wherein the programmable controller determines a rotational speed of the brushless motor by taking a proportional and integral error between a required speed and a measured speed, from which a new value for a PWM duty cycle is then calculated.

30. The brushless motor control system of claim 29, in which a regulation loop is interrupt driven to ensure that the determination of the rotational speed of the brushless motor occurs regularly.

* * * * *